(12) United States Patent
Brandt

(10) Patent No.: US 11,376,496 B1
(45) Date of Patent: Jul. 5, 2022

(54) SYSTEM AND METHOD FOR AN INTERACTIVE ACCESSORY ON CONTROLLER

(71) Applicant: Donald Wayne Brandt, McKinney, TX (US)

(72) Inventor: Donald Wayne Brandt, McKinney, TX (US)

(*) Notice: Subject to any disclaimer, the term of this patent is extended or adjusted under 35 U.S.C. 154(b) by 0 days.

(21) Appl. No.: 17/507,434

(22) Filed: Oct. 21, 2021

(51) Int. Cl.
*A63F 13/24* (2014.01)

(52) U.S. Cl.
CPC ...... *A63F 13/24* (2014.09); *A63F 2300/1043* (2013.01)

(58) Field of Classification Search
CPC ....................................................... A63F 13/24
See application file for complete search history.

(56) References Cited

U.S. PATENT DOCUMENTS

| | | | |
|---|---|---|---|
| 5,883,690 A * | 3/1999 | Meyers | A63F 13/02 345/161 |
| 8,715,071 B2 | 5/2014 | Keenan et al. | |
| 10,419,054 B1 | 9/2019 | VanTassell et al. | |
| 11,022,306 B2 | 6/2021 | Romero et al. | |
| 2011/0281649 A1 * | 11/2011 | Jaouen | A63F 13/245 463/36 |
| 2017/0106274 A1 | 4/2017 | Ramcheran et al. | |
| 2019/0160388 A1 | 5/2019 | Hacsi | |

FOREIGN PATENT DOCUMENTS

KR 101837912 B1 3/2018

OTHER PUBLICATIONS

Andreas Veiling, Types of Bearings Uses Working Mechanisms Explained.pdf, Engineering Blog, https://fractory.com/types-of-bearings/, published on Aug. 25, 2020 (Year: 2020).*
The Original Fidget Retro: The Rubberized Classic Controller Game Pad Fidget Focus Toy with 8-Fidget Functions and Lanyard—Perfect for Relieving Stress (Original Version), https://www.amazon.com/Original-Fidget-Retro-Rubberized-Controller/dp/B06ZYKCPWR?th=1.*

* cited by examiner

Primary Examiner — Yingchuan Zhang
(74) Attorney, Agent, or Firm — Christopher Mayle; Bold IP, PLLC

(57) ABSTRACT

A system and method for an interactive video game controller accessory designed to be operated by an individual's left or right hand where the video game controller accessory may be placed or positioned on an existing video game controller and spun by the player during downtime of video games.

18 Claims, 5 Drawing Sheets

SYSTEM AND METHOD FOR AN INTERACTIVE ACCESSORY ON CONTROLLER

FIELD OF THE DISCLOSURE

This disclosure relates generally to the field of interactive video game controllers and more particularly a video game controller accessory designed to allow a person to spin the accessory during downtimes.

BACKGROUND

The video game industry has become larger than ever and has spawned many innovations in both software and related hardware that provide various benefits to their players. Videos have become more advanced as well and require multiple controls to fully navigate the virtual world the games take place in. Multiple controls are also important for being fully immersed in the virtual world. However, there is a lot of downtime while playing video games, such as during loading screens, after you die online, or waiting in lobbies. During downtime there have been minigames designed to be played while waiting but these are far in between. Thus, there exists the need for an interactive controller accessory that may be controlled during video game downtime.

SUMMARY

The disclosure presented herein relates to an apparatus positioned over a control of an interactive controller whereby the apparatus has a spinnable element and a control element to mimic the control of the interactive controller.

The disclosure presented herein also relates to an apparatus positioned on an interactive controller, the apparatus including a bearing, a ring surrounding the bearing such that the ring and bearing spin in unison, a base positioned inside of the ring, the base having a plurality of elements that snap onto a thumb stick of the interactive controller, whereby the base has an inner portion and four perimeter components extending outward and downward from the inner portion, the four perimeter components configured to be removably secured to the thumb stick, whereby the four perimeter components are trapezium in shape with gaps between the four perimeter components, whereby the inner portion has a circular recess, the apparatus also having a controller extension, the controller extension having a shaft that is secured within the circular recess, the controller extension having an interface element connected to the shaft, whereby the ring is oblate spheroid in shape with a hollow body, whereby the ring has a circular aperture for securing the bearing, whereby the bearing has an inner race rotatable relative to an outer race.

The disclosure presented herein also relates to a spinnable apparatus positioned on an interactive controller, the spinnable apparatus including a controller extension that operates in unison when positioned over a control of the interactive controller, a bearing, a ring surrounding the bearing such that the ring and bearing spin in unison, a base, the base having an inner portion and a plurality of elements that snap onto a thumb stick of the interactive controller, whereby the inner portion has a circular recess for securing a shaft of the controller extension, whereby the plurality of elements extend outward and downward from the inner portion, the plurality of elements configured to be removably secured to the thumb stick, whereby the plurality of elements are trapezium in shape with gaps between the plurality of elements, whereby the ring is oblate spheroid in shape with a hollow body, whereby the ring has a circular aperture for securing the bearing, whereby the bearing has an inner race rotatable relative to an outer race.

The preceding and following embodiments and descriptions are for illustrative purposes only and are not intended to limit the scope of this disclosure. Other aspects and advantages of this disclosure will become apparent from the following detailed description.

BRIEF DESCRIPTION OF THE DRAWINGS

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure.

DETAILED DESCRIPTION

Figure 1:
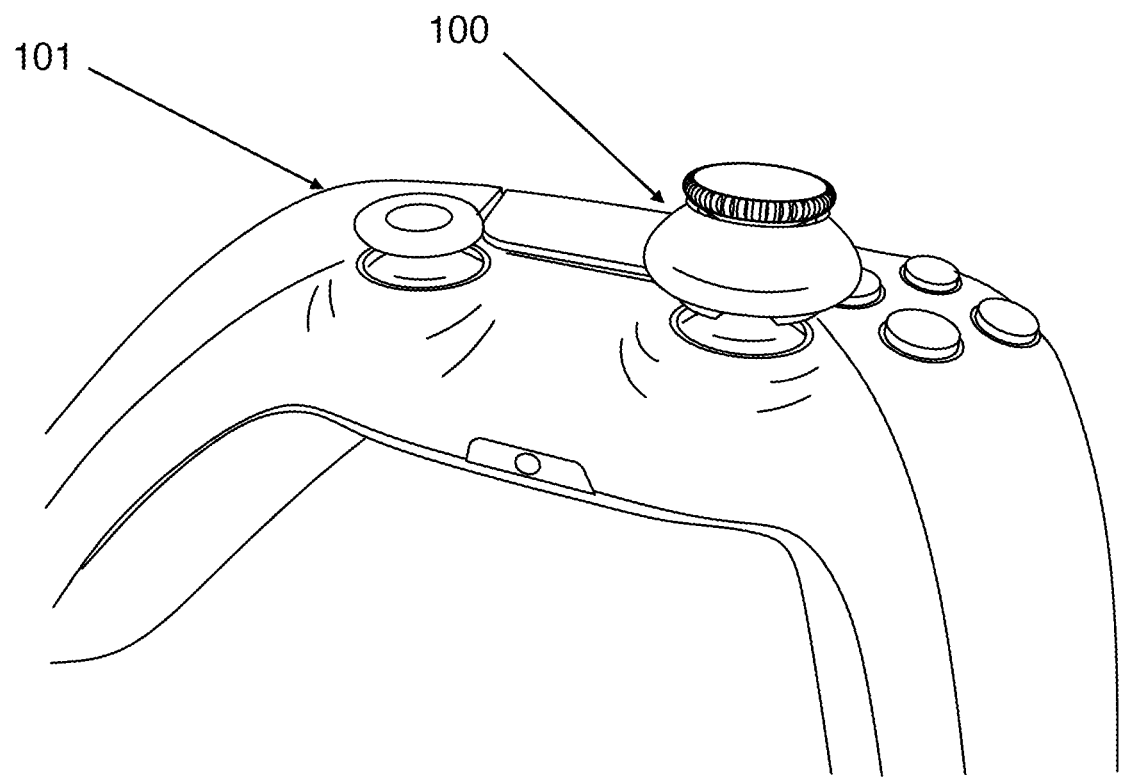
FIG. 1 is an illustration of a video game accessory on a video game controller in accordance with the embodiments of the present invention.

In the Summary above and in this Detailed Description, and the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, ingredients, and steps, among others, are optionally present. For example, an article "comprising" (or "which comprises") components A, B, and C can consist of (i.e., contain only) components A, B, and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)—(a second number)," this means a range whose lower limit is the first number and upper limit is the second number. For example, 25 to 100 mm means a range whose lower limit is 25 mm and upper limit is 100 mm.

Certain terminology and derivations thereof may be used in the following description for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

The present description includes one or more embodiments for a spinnable interactive video game controller accessory or apparatus designed to be spun by a player's left or right hand, acting as a fidget spinner, whereby the video game controller accessory may be placed or positioned on a portion of an existing controller such as above the thumb stick to mimic the movements of the thumb stick. The present invention is designed to help with boredom, help with staying focused, helps relieve stress, as well as reduce anxiety such as when a player sits and plays games or watches movies. Elements included herein are meant to be illustrative rather than restrictive. Persons having ordinary skill in the art relevant to the present disclosure may understand there to be equivalent elements that may be substituted with the present disclosure without changing the essential function or operation of the controller accessory.

Figure 2:
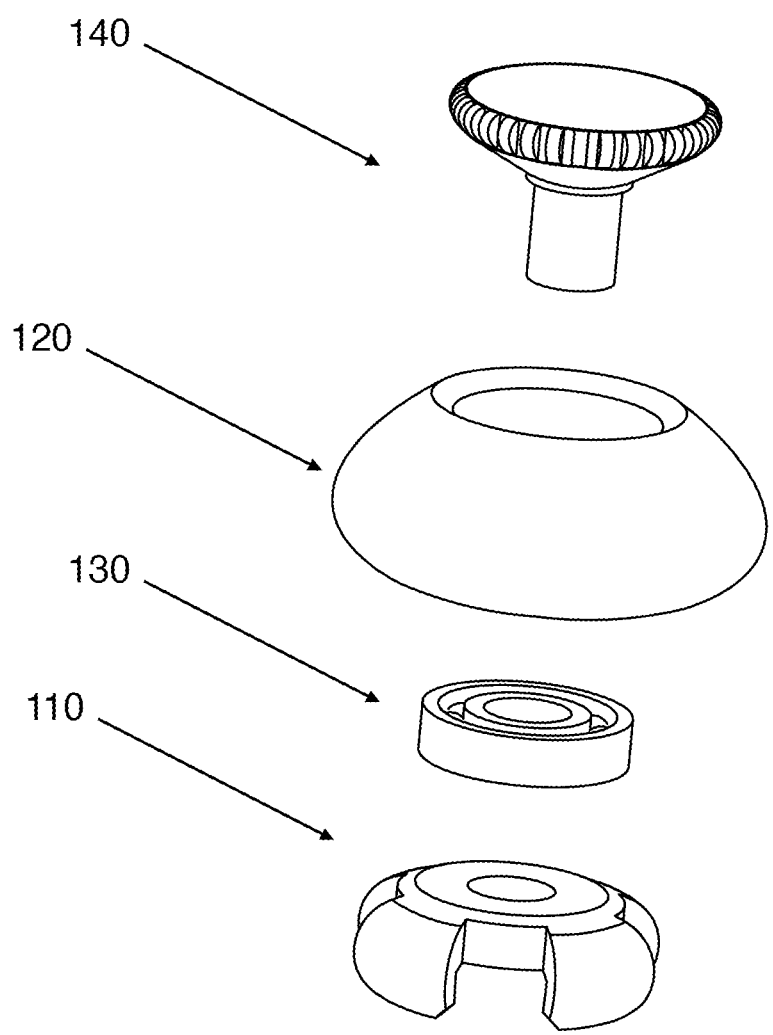
FIG. 2 is an exploded view of the video game accessory.
Figure 3:
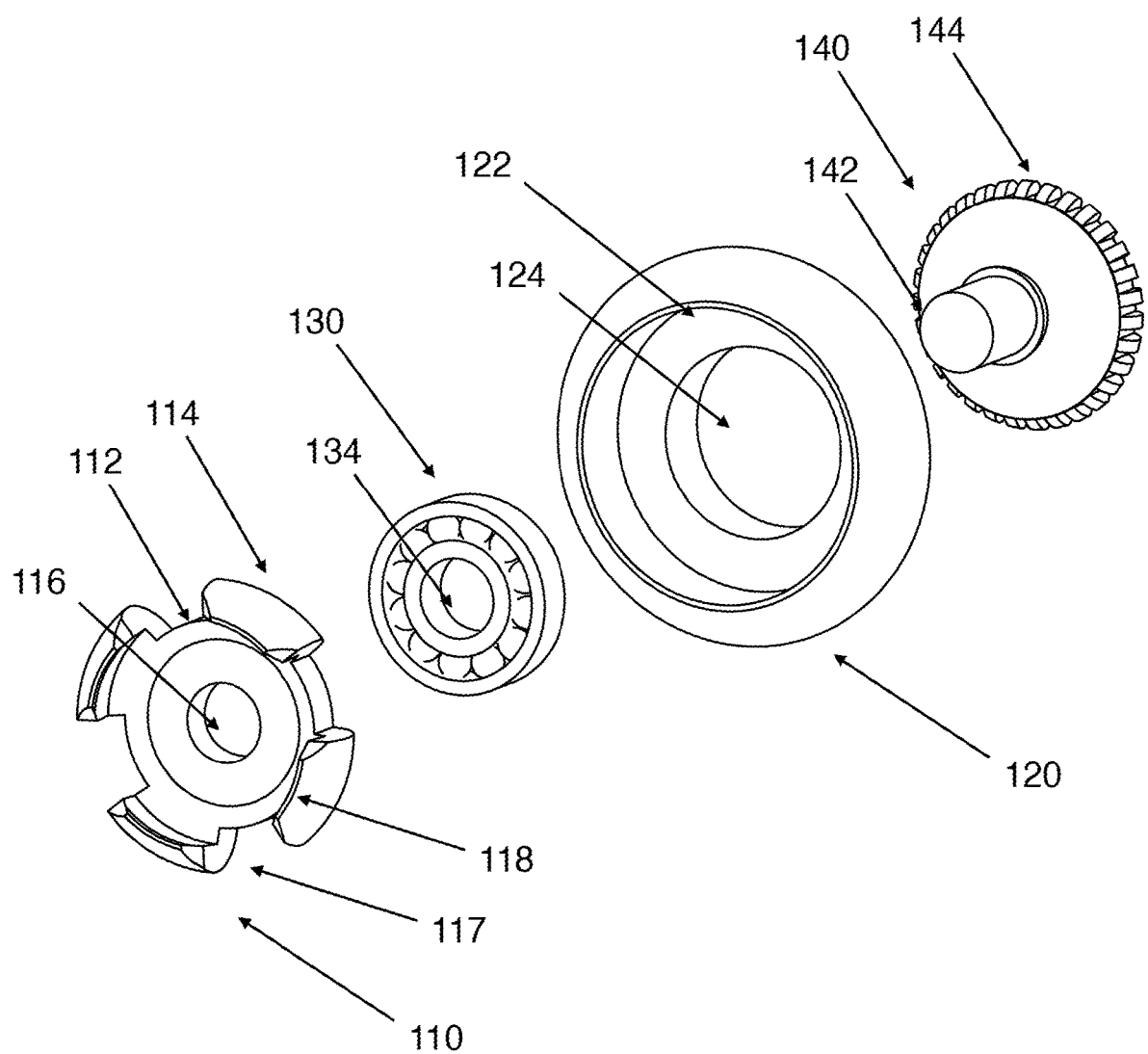
FIG. 3 is another exploded view of the video game accessory.
Figure 4:
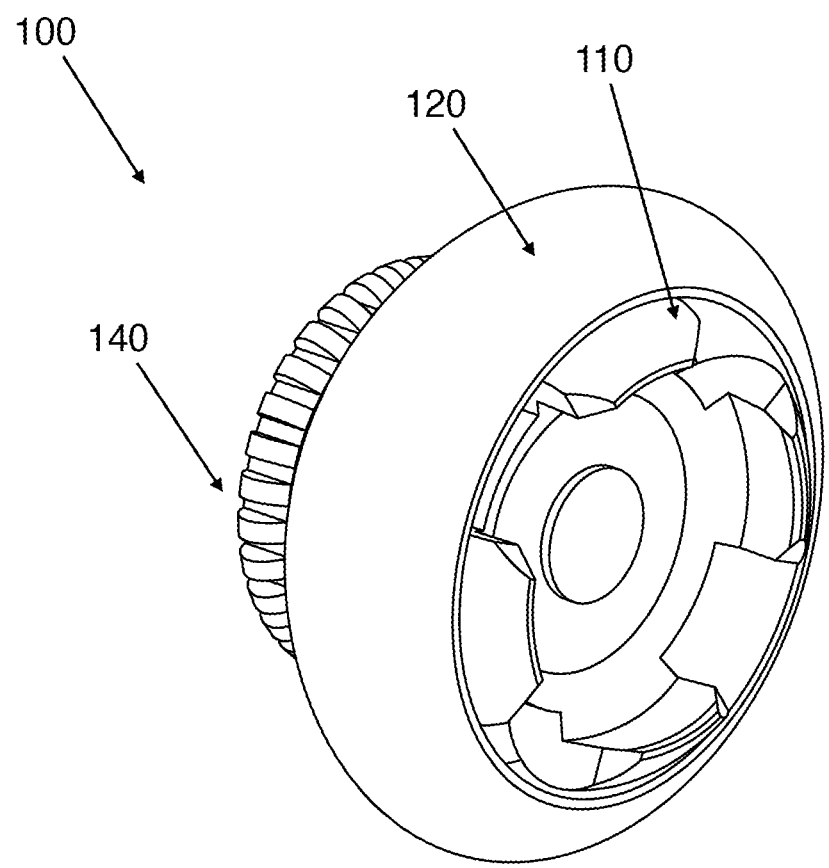
FIG. 4 is bottom view of the video game accessory.
Figure 5:
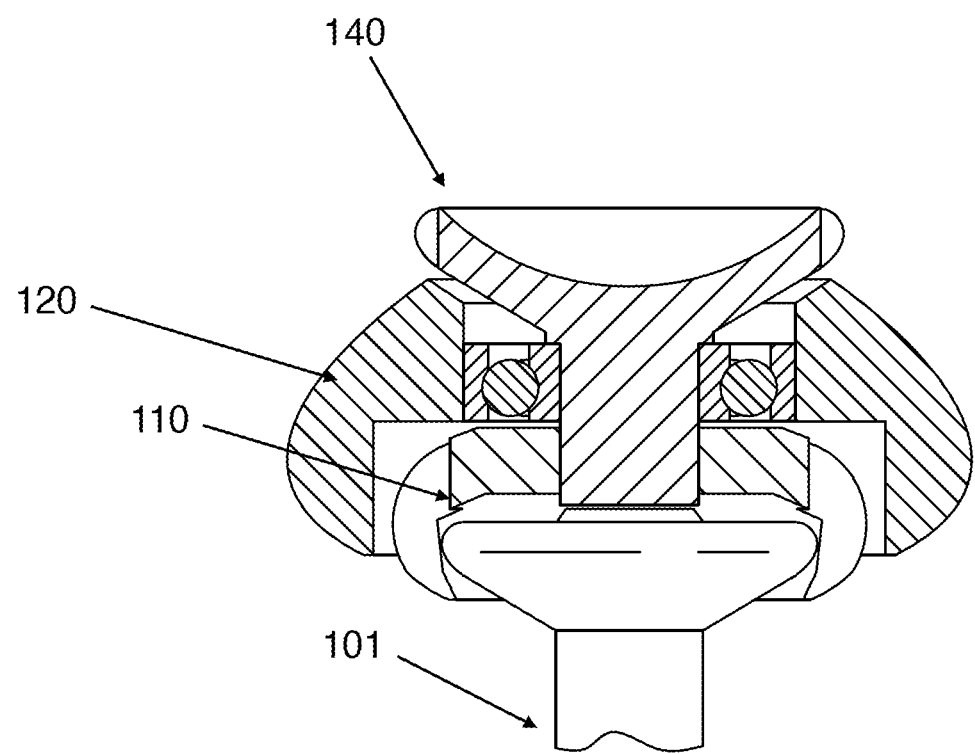
FIG. 5 is a cross-sectional view of the video game accessory.

Turning to FIG. 1, FIG. 1 is a perspective view of an interactive video game controller accessory 100 positioned on a video game controller 101 (which may also be referred to as controller 101) according to an embodiment of the present invention. Interactive video game controller accessory 100 may be used by a player using their left hand or right hand and is controllable from any side where player's hand is angled. Interactive video game controller accessory 100 may have four main components, including a base 110, a ring 120, a bearing 130, and a control extension 140 as illustrated in FIG. 2. Base 110 and ring 120 may be made of a plastic, such as injection-molded polycarbonate (PC)/acrylonitrile butadiene styrene (ABS) or polyamide (nylon), metal, or other materials typically used in the manufacturing of video game controllers that do not stray away from the intent of the current invention. The material of interactive video game controller accessory 100 may exhibit heat resistance, mechanical strength, or rigidity for continuous playing of interactive games without degradation or deformation of the controller accessory 100 or the control.

Base 110 holds on to the thumb-stick, joystick, or other control positioned on the controller 101. The base 110 holds on to the controller thumb-stick which keeps the rest of the parts for falling off the controller 101. Base 110 may be designed and shaped for the specific controller 101. In one or more non-limiting embodiments, base 110 may have an inner portion 112 and four perimeter components 114 extending outward and downward from inner portion 112.

Inner portion 112 may be circular in shape with a circular recess 116 acting as a retention pocket for control extension 140 whereby control extension 140 fits inside circular recess 116 when assembled. Perimeter components 114 may be symmetrical to each other along a central axis. Perimeter components 114 may each have a trapezium shape with two side surfaces 117 extending outward from inner portion 112 and from each other. Gaps may be integrally formed around base 110 based on the positioning of perimeter components 114. Side surfaces 117 may be connected by a concave curving outer surface 118. When positioned over a controller, perimeter components 114 may be positioned directly over the thumb stick whereby perimeter components 114 may then be removably fastened to the thumb stick whereby they may be snapped into place.

Ring 120 is designed to be the actual spinning element that a player comes into contact with. Ring 120 fits around bearing 130 to give a bigger surface to spin bearing 130 such that bearing 130 and ring 120 spin in unison. Ring 120 is structured such that base 110 may be pressed into cavity 122. Ring 120 may be hollow with an oblate spheroid shape (a sphere squashed from the top). However, this is non-limiting and other shapes may be used such as a sphere, a cylinder, a cube, or any shaped prism. At the top surface of ring 120 may be a circular recess 124 that is aligned with circular recess 116 such that control extension 140 may pass through circular recess 124 to be secured inside circular recess 116. Circular recess 124 acts as a cavity for bearing 130 such that bearing 130 may be pressed into and secured within circular recess 124.

As discussed, bearing 130 allows ring 120, which is positioned around bearing 130 to spin. Bearing 130 is positioned between base 110 and control extension 140 inside of cavity 122 of ring 120. Bearing 130 may be a standard commercially available metal bearing adapted to have an inner race rotatable relative to an outer race. Bearing 130 may have a circular recess 134 aligned with circular recess 116 and circular recess 124 such that control extension 140 may through circular recess 134 to be secured inside circular recess 116.

Control extension 140 slides through bearing 130 and provides a place to move the whole thumb-stick extension while operating an interactive game similar to the existing controls on the controller. Control extension 140 may sit on a multifunctional control or thumb sticks that extend outward from the top surface of ring 120. Control extension 140 is designed to be a substitute for an existing control that is designed to normally control movement and viewing (camera angles or first-person perspective view) of an avatar and is intended to be operated by a player. Control extension 140 may have a shaft 142 that is received into circular recess 116 and secured by a frictional fit or one or more fasteners such as hinges, latches, or adhesive. Shaft 142 may be tubular in shape and extend upward into an interface element 144 that may be the component directly manipulated by a player. Interface element 144 may be made of rubber or have rubber surrounding it. Interface element 144 may be disc, cylindrical, or oblate spheroid in shape.

In other non-limiting embodiments, direction pads, depressible in four different directions (e.g., up, down, left, and right), may replace or work in conjunction with control extension 140. The direction pads are intended to be operated by one of a player's thumbs, typically either as an alternative to the thumb sticks or for three directional movement and viewing and/or to provide additional actions similar to buttons for interactive games with multiple controls needed. In one or more further embodiments, control extension 140 may have a number of different shapes and configurations suitable for various interactive video games.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

What is claimed is:

1. An apparatus positioned on an interactive controller, the apparatus comprising:
   a bearing; and
   a ring surrounding the bearing such that the ring and bearing spin in unison, wherein the ring is oblate spheroid in shape with a hollow body.

2. The apparatus of claim 1 further comprising: a base positioned inside of the ring, the base having a plurality of elements that snap onto a thumb stick of the interactive controller.

3. The apparatus of claim 2 wherein the base has an inner portion and four perimeter components extending outward and downward from the inner portion, the four perimeter components configured to be removably secured to the thumb stick.

4. The apparatus of claim 3 wherein the four perimeter components are trapezium in shape with gaps between the four perimeter components.

5. The apparatus of claim 4 wherein the inner portion has a circular recess.

6. The apparatus of claim 5, further comprising a controller extension, the controller extension having a shaft that is secured within the circular recess.

7. The apparatus of claim 6, the controller extension having an interface element connected to the shaft.

8. The apparatus of claim 1, wherein the ring has a circular aperture for securing the bearing.

9. The apparatus of claim 1, wherein the bearing has an inner race rotatable relative to an outer race.

10. A spinnable apparatus positioned on an interactive controller, the spinnable apparatus comprising:
    a controller extension that receives a thumb stick of the interactive controller, the controller extension having a thumb stick component that duplicates movement of the thumb stick of the interactive controller; and
    an external spinnable element positioned between the thumb stick component and the thumb stick wherein the controller extension is spinnable 360 degrees when spun by a user.

11. The spinnable apparatus of claim 10 further comprising:
    a bearing; and
    a ring surrounding the bearing such that the ring and bearing spin in unison, wherein the external spinnable element is spinnable whilst the thumb stick component and thumb stick are stationary.

12. The spinnable apparatus of claim 11, wherein the ring is oblate spheroid in shape with a hollow body.

13. The spinnable apparatus of claim 12, wherein the ring has a circular aperture for securing the bearing.

14. The spinnable apparatus of claim 13, wherein the bearing has an inner race rotatable relative to an outer race.

15. The spinnable apparatus of claim 10 further comprising: a base, the base having an inner portion and a plurality of elements that snap onto the thumb stick of the interactive controller.

16. The spinnable apparatus of claim 15 wherein the inner portion has a circular recess for securing a shaft of the controller extension.

17. The spinnable apparatus of claim 16 wherein the plurality of elements extend outward and downward from the inner portion, the plurality of elements configured to be removably secured to the thumb stick.

18. The spinnable apparatus of claim 15 wherein the plurality of elements are trapezium in shape with gaps between the plurality of elements.

* * * * *